United States Patent
Li et al.

(10) Patent No.: US 7,136,066 B2
(45) Date of Patent: Nov. 14, 2006

(54) SYSTEM AND METHOD FOR SCALABLE PORTRAIT VIDEO

(75) Inventors: Jiang Li, Beijing (CN); Keman Yu, Beijing (CN); Tielin He, Jiangxi Province (CN); Yunfeng Lin, Jiangxi (CN); Shipeng Li, Irvine, CA (US)

(73) Assignee: Microsoft Corp., Redmond, WA (US)

( * ) Notice: Subject to any disclaimer, the term of this patent is extended or adjusted under 35 U.S.C. 154(b) by 351 days.

(21) Appl. No.: 10/302,653

(22) Filed: Nov. 22, 2002

(65) Prior Publication Data

US 2004/0100586 A1    May 27, 2004

(51) Int. Cl.
*G06T 17/00*    (2006.01)

(52) U.S. Cl. ..................................... 345/428
(58) Field of Classification Search ............... 345/428, 345/581, 589, 596–599
See application file for complete search history.

(56) References Cited

U.S. PATENT DOCUMENTS

| | | | | |
|---|---|---|---|---|
| 5,345,317 A | * | 9/1994 | Katsuno et al. | 382/239 |
| 5,543,939 A | * | 8/1996 | Harvey et al. | 375/240.02 |
| 5,848,198 A | * | 12/1998 | Penn | 382/276 |
| 6,101,274 A | * | 8/2000 | Pizano et al. | 382/176 |
| 6,674,900 B1 | * | 1/2004 | Ma et al. | 382/176 |

OTHER PUBLICATIONS

U.S. Appl. No. 10/302,624, filed Dec. 1, 2002, Yu et al.
U.S. Appl. No. 09/844,549, filed Apr. 28, 2001, Li et al.
Jiang Li, Gang Chen, Jizheng Xu, Yong Wang, Hanning Zhou, Keman Yu, King To Ng and Heung-Yeung Shum, "Bi-level Video: Video Communication at Very Low Bit Rates," *ACM Multimedia Conference 2001*, Sep. 30-Oct. 5, Ottawa, Ontario, Canada, pp. 392-400.
N. Otsu, "A threshold selection method from gray-level histogram," *IEEE Trans. System Man Cybernet. SMC-8*, 1978, pp. 223-237.
P.K. Sahoo, S. Soltani, and A.K.C. Wong, "A survey of thresholding techniques," *Computer Vision Graphics Image Processing*, 41, 1988, 233-260.
U.S. Appl. No. 10/302,653, filed Nov. 22, 2002, Li et al.
Ridler, T.W. and S. Calvard, Picture threshold using an iterative selection method, *IEEE Transactions on System, Man, and Cybernetics*, vol. SMC-8, 8:630-632.

* cited by examiner

Primary Examiner—Kee M. Tung
Assistant Examiner—Michelle K. Lay
(74) Attorney, Agent, or Firm—Lyon & Harr, LLP; Katrina A. Lyon

(57) ABSTRACT

Generation, coding and transmission of an effective video form, scalable portrait video. As an expansion to bi-level video, portrait video is composed of more gray levels, and therefore possesses higher visual quality while it maintains a low bit rate and low computational costs. Portrait video is a scalable video in that each video with a higher level always contains all the information of the video with a lower level. The bandwidths of 2–4 level portrait videos fit into the bandwidth range of 20–40 Kbps that GPRS and CDMA 1X can stably provide. Therefore, portrait video is very promising for video broadcast and communication on 2.5 G wireless networks. With portrait video technology, this system and method is the first to enable two-way video conferencing on Pocket PCs and Handheld PCs.

36 Claims, 10 Drawing Sheets
(1 of 10 Drawing Sheet(s) Filed in Color)

(a)

(b)

(a)

(b)

(c)

(a)

(b)

(a)                  (b)

SYSTEM AND METHOD FOR SCALABLE PORTRAIT VIDEO

BACKGROUND

1. Technical Field

This invention is directed toward a system and method for video compression/decompression. More specifically, this invention is directed towards the generation, coding and transmission of a video form.

2. Background Art

Wireless networks have been deployed rapidly in recent years. GPRS (General Packet Radio Service) and CDMA 1X (Code Division Multiple Access) as 2.5G solutions to wide area wireless networks are available in increasingly more regions in Europe, North America and Southeast Asia. Wireless LAN 802.11 and Bluetooth also compete strongly for local area wireless networks. The fast expansion of wireless networks calls for rich content and services for consumers. However, due to limited channel bandwidths in these wireless networks and the weak processing power of mobile devices, conventional media contents are difficult to distribute.

Bi-level video [1] is an effective solution for low bandwidth mobile video conferencing, where previously there did not exist suitable video coding technology for current wireless network and mobile device conditions. It was observed that although conventional video processing and coding technologies such as MPEG1/2/4 [2] and H.261/263 [3, 4] could also code video for low bit rates, the resultant images usually looked like a collection of color blocks and the motion in the scene became discontinuous. The block artifacts of these methods originate from the common architecture of MPEG1/2/4 and H.261/263, i.e. discrete cosine transform (DCT)-based coding. In DCT-based coding, low spatial frequency values that represent the "basic colors" of the blocks possess high priority. However, in video communications, facial expressions that are represented by the motions of the outlines of the face, eyes, eyebrows and mouth deliver more information than the basic colors of the face. Bi-level video uses bi-level images to represent these facial expressions, which results in very high compression ratios. Experiments show that at low bandwidths, bi-level video provides clearer shape, smoother motion, shorter initial latency and much cheaper computational cost than do DCT-based technologies. Bi-level video is especially suitable for small mobile devices such as handheld personal computers (PCs), palm-size PCs and mobile phones that possess small display screens and light computational power, and that work in wireless networks with limited bandwidths.

In bi-level video, scenes are always represented by two colors, usually black and white. Although black and white are sufficient to describe the outlines of a scene, the visual quality is not very satisfactory. Given that many mobile devices are now able to display at least four levels of grayscale, users of a research prototype for mobile video conferencing have expressed a desire for improved video that contains more gray values and has better visual quality. With this improved video, bit rates must also be kept low.

After reviewing existing video technologies that cover different bandwidth ranges, it was found that MPEG/H.26x performs well in the bandwidth range greater than about 40 Kbps and bi-level video works well in the range of 10–20 Kbps for quarter common intermediate format (QCIF) size (e.g., 144 lines and 176 pixels per line). However, the visual quality of bi-level video can no longer be improved even if greater bandwidth is assigned to it. The task is then how to improve the visual quality of bi-level video in the bandwidth range of 20–40 Kbps or how to design a new video form that can work well in this range. It is very important to develop a video form to fit into the 20–40 Kbps bandwidth range because this is the range that 2.5G wireless networks such as GPRS and CDMA 1X can stably provide, although the theoretical bandwidths of GPRS and CDMA 1X are 115 Kbps and 153.6 Kbps, respectively.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

This invention relates to the generation, coding and transmission of an effective video form referred to as scalable portrait video. This form of video is especially useful for mobile video conferencing. As an expansion to bi-level video, portrait video is composed of more gray levels, and therefore possesses higher visual quality while it maintains a low bit rate and low computational costs. Portrait video is a scalable video in that each video with a higher level always contains all the information of the video with a lower level. The bandwidths of 2–4 level portrait videos fit into the bandwidth range of 20–40 Kbps that GPRS and CDMA 1X can stably provide. Therefore, portrait video is very promising for video broadcast and communication on 2.5G wireless networks. With portrait video technology, this system and method is the first to enable two-way video conferencing on Pocket PCs and Handheld PCs.

In the four level embodiment, to generate a portrait video frame, the scalable portrait video system and method obtains a frame of a video in grayscale format. This frame can either be input in grayscale format or can be converted to gray scale from a RGB or other color format using conventional methods. A first threshold $T_1$ is applied to the grayscale frame to generate two partial grayscale images, a first of which, $S_1$, has pixels which have values greater than (or equal to in one embodiment) the first threshold $T_1$, and a second of which, $S_2$, has pixels which have values less than said first threshold $T_1$. A first bi-level image is also generated comprising pixels assigned a first binary value if the value of the correspondingly located pixel in the grayscale frame exceeds (or equals in one embodiment) $T_1$ and pixels assigned a second binary value if the value of the correspondingly located pixel in the grayscale frame is less (or equal to in one embodiment) than $T_1$.

A second threshold $T_2$, is applied to the first partial grayscale image, $S_1$, to generate a second bi-level image which has pixels assigned a first binary value if the value of the correspondingly located pixel in the first partial grayscale image exceeds (or equals in one embodiment) $T_{21}$ and pixels assigned a second binary value if the value of the correspondingly located pixel in the first partial grayscale image is less than (or equal to) $T_{21}$. Likewise a threshold $T_{22}$ is applied to the second partial grayscale image, $S_2$, to generate a third bi-level image comprising pixels assigned a first binary value if the value of the correspondingly located pixel in the second partial grayscale image exceeds (or equals) $T_{22}$ and pixels assigned a second binary value if the value of the correspondingly located pixel in the second partial grayscale image is less than (or equal to in one embodiment) $T_{22}$. It should be noted that $T_{21} > T_1$ and $T_{22} < T_1$. The first, second and third bi-level images can then be combined to create a four level grayscale video frame representing a frame of the portrait video, or the images can be encoded and possibly transmitted first.

In one embodiment, to combine the first, second and third bi-level images, an array of two bit elements is created where each element corresponds to a different pixel location of the bi-level images. In one embodiment the second and third bi-level images are combined prior to encoding. The elements of the array have a most significant bit taken from the associated pixel location of the first bi-level image and a least significant bit taken from the associated pixel location of the combined bi-level image. Different gray scale levels are assigned to each possible element value to create the four level grayscale frame.

To transmit the encoded bi-level images, if the available bandwidth is small, approximately 10–20 Kbps in one embodiment, then the encoded first bi-level image is transmitted. However, if the available bandwidth is increased, in one embodiment to approximately 20–40 Kbps, then the encoded second and third bi-level images are transmitted to display more grayscale levels than available with said first bi-level image alone. Likewise, if an available transmission bandwidth is large, then the encoded second and third bi-level images are transmitted to display more grayscale levels than available with said first bi-level image, and if this bandwidth is decreased, then only the encoded first bi-level image is transmitted. The encoded second and third bi-level video frames may be transmitted by fading them in and out to the first bi-level video transmission when the available bandwidth is changed.

As indicated previously, the first, second and third bi-level images may all be encoded and potentially transmitted prior to being used to create a portrait video frame. This is done in one embodiment using bi-level video coding. In this bi-level encoding of each of the first, second and third bi-level images, for each pixel in raster order: (1) a context is computed and assigned a context number; (2) a probability table is indexed using the context number; (3) the indexed probability is used to drive an arithmetic coder; and (4) the arithmetic coder is terminated when the final pixel in each respective bi-level image has been processed. Alternately, the first, second and third bi-level images can be encoded by first combining the second and third bi-level images by adding the pixel values of corresponding pixel locations of these images to create a combined bi-level image and then separately encoding the first bi-level image and the combined bi-level image using a bi-level encoding process. The encoding of the combined bi-level image can be done by, for each pixel in raster order: (1) determining whether the correspondingly located pixel in the first bi-level image has the first binary value or the second binary value; (2) whenever the correspondingly located pixel in the first bi-level image has the first binary value, computing a context and assigning context number to this context; indexing a probability table using the context number; and using the indexed probability to drive an arithmetic coder; and (3) whenever the correspondingly located pixel in the first bi-level image has the second binary value, computing a context and assigning context number to said context; indexing a probability table using the context number; and using the indexed probability to drive an arithmetic coder. When the correspondingly located pixel in the first bi-level image has the first binary value, a value is assigned to each context position of the context equal to the value of the corresponding pixel location of the combined bi-level image, otherwise the second binary value is assigned. Likewise, if the first bi-level image has the second binary value, a value is assigned to each context position of the context equal to the value of the corresponding pixel location of the combined bi-level image whenever that pixel location, otherwise the first binary value is assigned.

In one embodiment of the scalable portrait system and method, the first threshold $T_1$ can be set by a user. The second threshold $T_{21}$ and third thresholds $T_{22}$ are then automatically set to $T_1$ plus and minus a prescribed number. In a tested embodiment this prescribed number was 16. Alternately, these thresholds can be automatically calculated via conventional thresholding techniques. In one embodiment Ostu's single thresholding method was applied to the grayscale frame to obtain the optimal threshold values for $T_1$, $T_{21}$ and $T_{22}$.

The coding of four-level video can be easily extended to the coding of multiple-level video. Each partial grayscale image of a lower level video can be divided into two smaller partial grayscale images using a threshold. The value of each pixel in one smaller partial grayscale image is always greater or equal to the threshold and the value of each pixel in another smaller partial grayscale image is always smaller than the threshold. These smaller partial grayscale images can be converted into bi-level images, then be combined and encoded using bi-level video coding and finally become the lowest bit plane of the higher level video, while all the bit planes of the lower level video are used as the higher bit planes of the higher level video.

The multi-level video according to the present invention is called portrait video because the coding is ordered from outlines to details, and the videos with lower levels look like a portrait. Much different from DCT-based coding methods, which put first priority on the average colors of a scene, portrait video puts first priority on the outline of a scene and then adds more details to it if more levels are involved. In some sense, portrait video always delivers the most important information of a scene for a given bandwidth. Portrait video is scalable because each video of a higher level always contains all the information of the video of a lower level and enhances the lower level videos.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
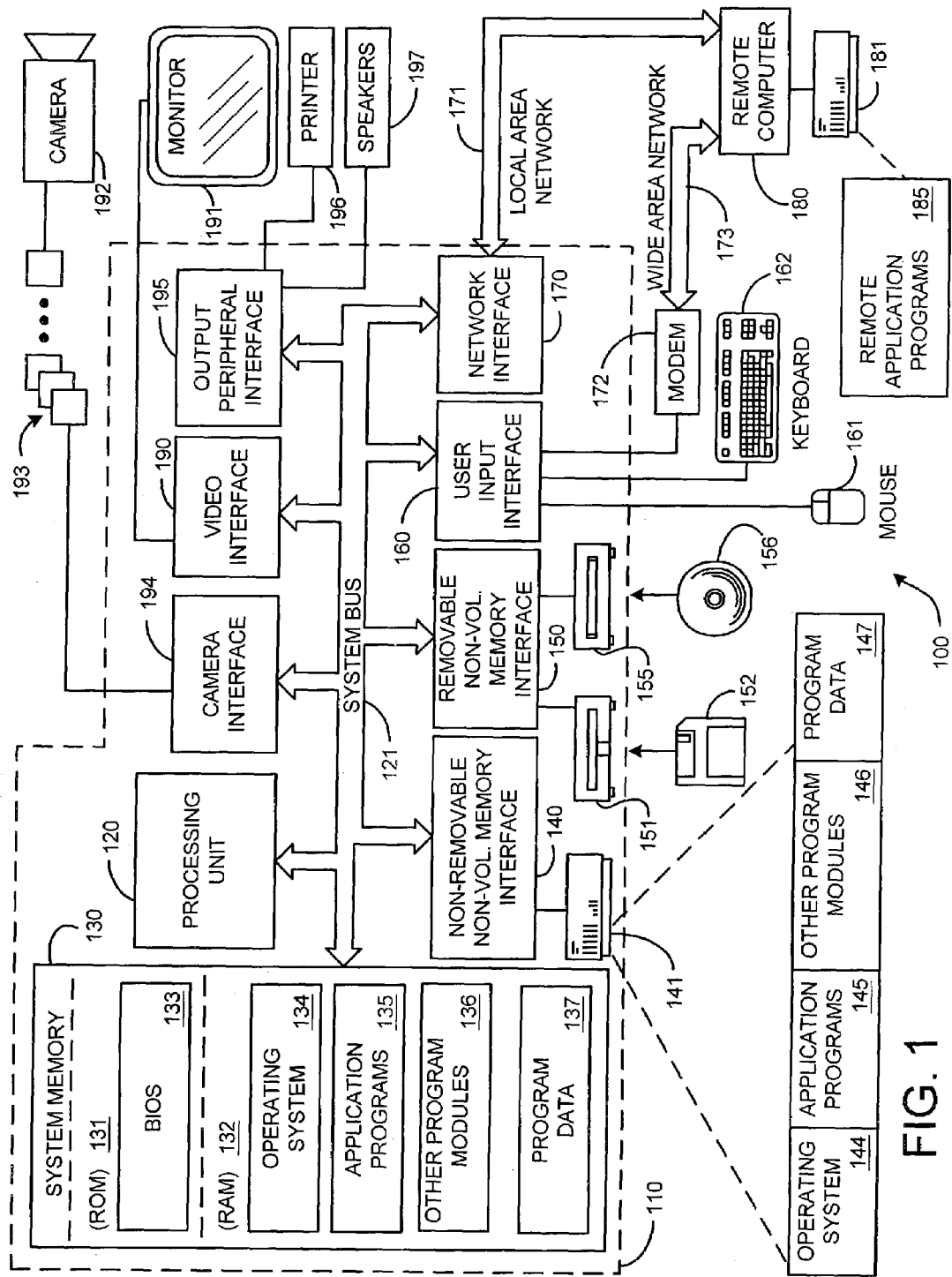
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anonremovable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modern 172 or other means for establishing communications over the WAN 173, such as the Internet. The modern 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Scalable Portrait Video System and Method.

In this section the scalable portrait video system and method according to the present invention is described. Additionally, since this system and method builds on bi-level video this system and method of generating video is provided by way of background.

2.1 Background-Generation of Bi-Level Video.

One embodiment of the scalable portrait video system and method of the present invention employs a bi-level video form. A system and method of generating bi-level video is the subject matter of a co-pending patent application entitled "A System and Process for Broadcast and Communication with Very Low Bit-Rate Bi-level or Sketch Video" filed on Apr. 28, 2001, Ser. No. 09/844,549.

The process of generating bi-level video is preceded by obtaining or capturing an input video that will typically contain both audio and video components. The input video can be either a color video or a gray-scale video. The generating process begins by inputting the aforementioned digitized full-color or gray scale video. The input video is then split into its audio and video portions. The splitting can be accomplished using any conventional audio-video splitting method. Typically, the input video will have been compressed using some conventional video compression process. Thus, once split, the video portion of the frame, which constitutes image frames of the video, is decompressed if necessary. Next, the input video image frames are converted into bi-level image frames and compressed using a very low bit-rate, bi-level video coding system and process, which will be described in detail below.

While the video component of the input video frame is being decompressed, and then recompressed, the audio component of the frame can be processed concurrently. The processing of the audio component of each input video frame entails decompressing the audio data if necessary using standard methods specific to the type of audio compression used to compress the data. Preferably this decompression would also include a standard noise reduction procedure. The audio data is then recompressed. In this case it is preferred that a very low bit-rate audio compression method be employed to minimize the amount of data that must be transmitted. Some currently available examples of this type of audio noise compression are the HP Mobile Voice, SIPRO ACELP.NET, FnG MPEG Layer 3, and Microsoft Corporation's Windows Media™ audio codec (version 2) methods.

After the video part of bi-level video has been generated and compressed, and the audio data has been compressed, the audio and video components are synchronized and combined to produce a complete bi-level video. Any appropriate existing AVI multiplexing technique can be used for this purpose, such as AVI Mux in Microsoft DirectMedia 6.0. The completed bi-level video can be in the form of a video file or can take the form of a bit stream. The video file can be used in a broadcast application where the broadcast of the video is to take place sometime after its generation. The bit stream form of the video could be used for an immediate broadcast application, or for a video communications application. It is noted that in the case of the bit stream, the bi-level generation process can be viewed as a sequential process with the foregoing actions being performed on each frame or a group of frames of the input video. As portions of the overall bi-level video are generated, they are transmitted thus creating the aforementioned bit stream.

In order to transmit the bi-level video over a network to a receiving device, either from a previously generated file or as a real time bit stream, the video data will typically have to be prepared first using a packetizing technique applicable to the transmission method. For example, if the bi-level video is to be transmitted over the Internet, the data would be packetized via Internet protocols.

In general, the image frame portion of the bi-level video mentioned above is generated as follows. If the input video is a full color video, each frame is converted to a gray scale frame using conventional methods. The gray scale frames are then input in sequence to the present conversion process. Next, the incoming gray scale image frames are put through a group of conventional noise reduction filters to reduce noise. It is then determined whether the frame under consideration is an intra-frame (i.e., I-frame) or an inter-frame (i.e., p-frame). If the frame is an I-frame, it is processed directly using an adaptive thresholding procedure. Otherwise (i.e., the frame is a p-frame), it is compared with its immediately preceding frame using a static region detection and duplication procedure. The static region detection and duplication procedure entails inputting the gray scale image frame (j−1) preceding the p-frame under consideration. In addition, a dissimilarity threshold is input. This dissimilarity threshold defines at what point the difference between a pixel in the p-frame under consideration and the correspondingly-located pixel in the preceding gray scale image frame is considered drastic enough to indicate a change due to movement between the frames. For image regions that are within a dissimilarity threshold, each pixel is duplicated from its corresponding pixel in the preceding frame, and for pixels of the p-frame under consideration that are greater than the threshold, the pixel values remain unchanged. Once this process is complete the modified p-frame undergoes the aforementioned adaptive thresholding procedure. The adaptive thresholding procedure is used to calculate a suitable threshold for each image frame. This threshold is employed to compute both a bi-level image frame and a two-dimensional confidence level array from each gray scale image frame, which are then output. The confidence level array is made up of confidence level values assigned to each pixel location of the frame that are indicative of how likely each pixel is to be the color indicated by the threshold. The confidence level of each bi-level pixel can be simply measured by the difference between the gray-scale value of a pixel and the threshold. If the difference falls outside a threshold band around the computed threshold value for the frame under consideration, then the confidence level is high and a first binary reliability value is preferably assigned to the pixel location. The width of the threshold band is inputted for this purpose from a rate control procedure. If, however, the aforementioned difference falls within the threshold band, the confidence level is lower and a second binary reliability value is preferably assigned to the pixel location. After that, each frame is compressed by an adaptive context-based arithmetic coding technique. If the frame is an I-frame, it is coded with an intra-frame template, otherwise it is coded with an inter-frame template constructed with respect to pixels in the previous frame. To this end, the bi-level image frame computed for the frame preceding the frame under consideration is input. For pixels with their confidence levels within the threshold band, their bi-level values are modified according to the prediction of the context-based arithmetic encoding. The result of the adaptive context-based arithmetic coding technique is a series of bits representing a compressed bi-level image frame. A rate control procedure that employs factor adjustment and frame dropping can be used to limit the bit rate of the compressed video data output to within a given bandwidth. As a result, when the present coding process operates at very low bandwidths, what is reserved in high priority is the outline features of the objects. The factors adjusted include the dissimilarity threshold mentioned previously, which is output for use in the static region detection and duplication procedure, and the width of a threshold band, which is output and used in the aforementioned adaptive thresholding procedure. Finally, the bit stream representing the compressed bi-level video frames is output.

2.2 Overview of Scalable Portrait Video

A better approach to providing a video technology that works well in both the 10–20 Kbps and 20–40 Kbps bandwidth ranges is a scalable video approach. Given a small bandwidth (e.g., of about 10–20 Kbps) the previous bi-level video is employed; if the available bandwidth increases (e.g., to about 20–40 Kbps), then more grayscale levels are smoothly added to the previous bi-level video. The final result is that greater bandwidths are utilized when available with more grayscale levels displayed.

Figure 2:
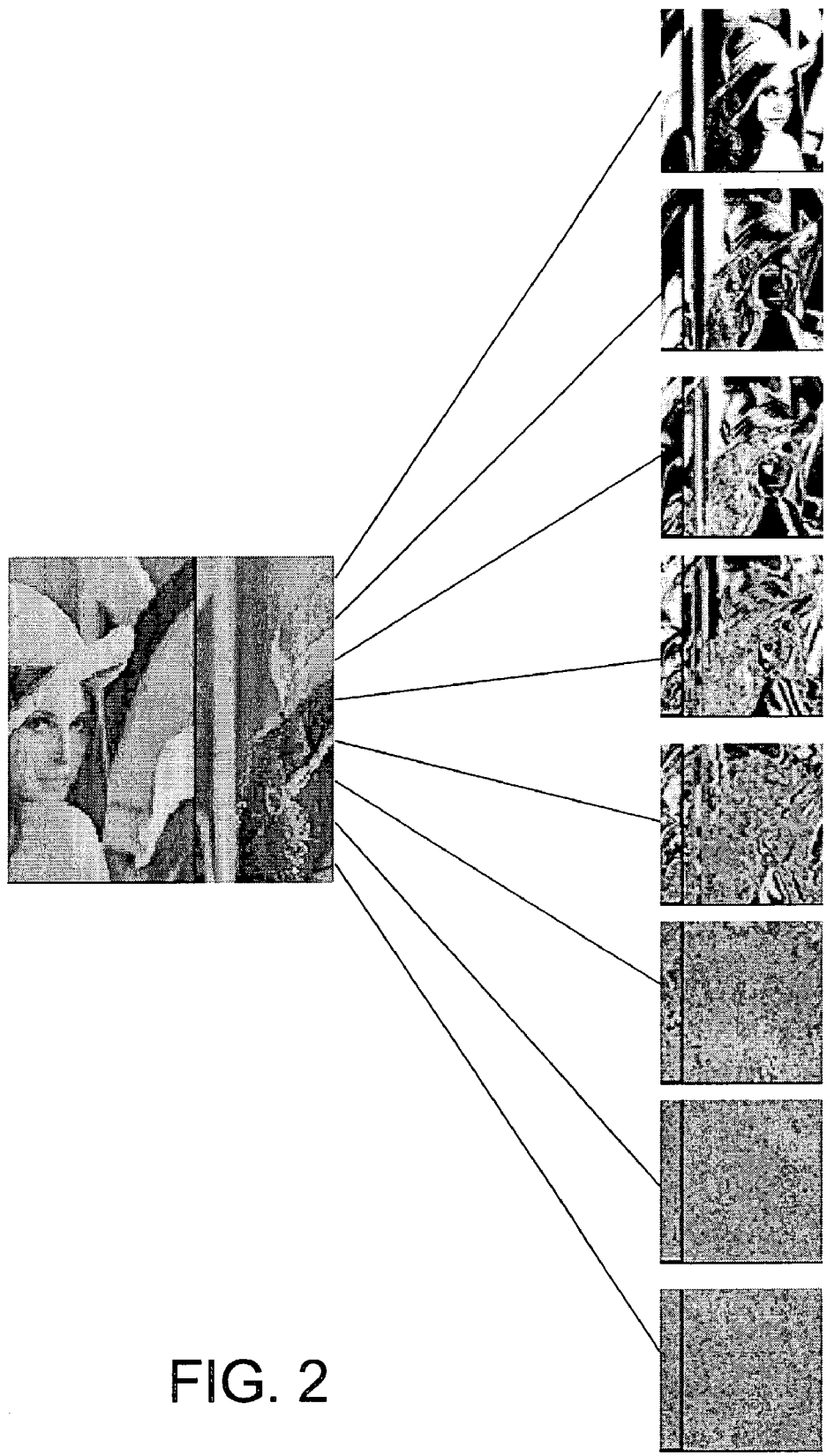
FIG. 2 shows a grayscale image and its bit planes from the highest bit plane at the top to the lowest bit plane at the bottom.

An intuitive solution to getting more grayscale levels into video is to code each bit plane of a grayscale video in turn. FIG. 2 shows a grayscale image and its bit planes from the highest bit plane at the top to the lowest bit plane at the bottom. As can be seen, in those lower bit planes, the images appear like noise.

It is very difficult to compress such noisy images. An image can be effectively compressed if it is regular. In arithmetic coding, if the value of a pixel can be predicted well, it can be coded well. However, the prediction quality of a pixel value depends on the regular distribution of its context, i.e. its neighbor pixels. Noise is not regular. In addition the efficiency of the approach in which all the bit planes are coded separately for a full grayscale image sequence will be much lower than that of a DCT-based coder, in which only residuals of an image sequence are coded. Multi-level video coding and DCT-based coding will be compared in Section 2.4. The bit-plane approach is applicable only if it is applied to limited numbers of bit planes.

Figure 3:
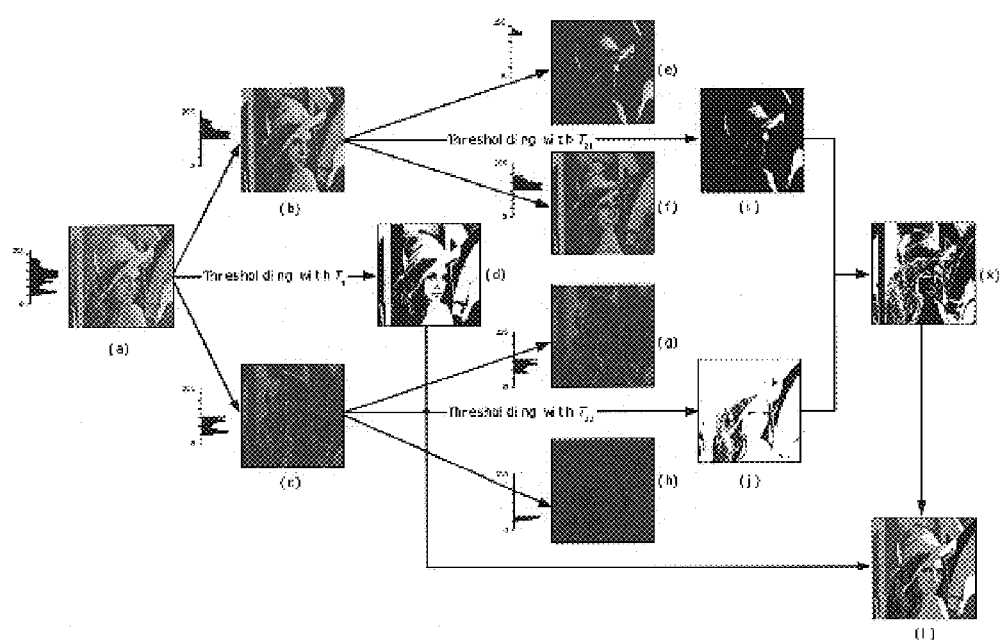
FIG. 3 depicts the generation of a four-level image.

Another approach to getting more grayscale levels is based on multiple divisions. If a threshold is used to convert a grayscale image (FIG. 3($a$)) into a bi-level image (FIG. 3($d$)), the threshold actually divides the original grayscale image into two parts: one part consisting of all the pixels with grayscale values greater than or equal to the threshold (FIG. 3($b$)), and the other part consisting of all the pixels with grayscale values less than the threshold (FIG. 3(c)). Their histograms are shown at the left. The remaining areas in FIG. 3(b) and (c) are marked by red. If two bits are available for each pixel of the final image, it would be possible to further detail both the brighter and darker areas of the bi-level image (FIG. 3(d)) with two gray levels respectively. This can be realized by using a higher threshold to divide FIG. 3(b) into two parts: FIG. 3(e) and FIG. 3(c), and using a lower threshold to divide FIG. 3(c) into two parts: FIG. 3(g) and FIG. 3(h). The remaining areas in FIG. 3(e), (f), (g) and (h) are also filled by red. The resultant bi-level images are FIG. 3(i) and FIG. 3(j), respectively. The first bit plane of the four-level image (FIG. 3(l)) is exactly the bi-level image FIG. 3(d). In the second bit plane (FIG. 3 2(k)) of the four-level image, for each pixel that is located in the brighter area of FIG. 3(d), its second bit value is equal to the binary value of the pixel in FIG. 3(i), and for each pixel that is located in the darker area of FIG. 3(d), its second bit value equals the binary value of the pixels in FIG. 3(j).

Figure 4A:
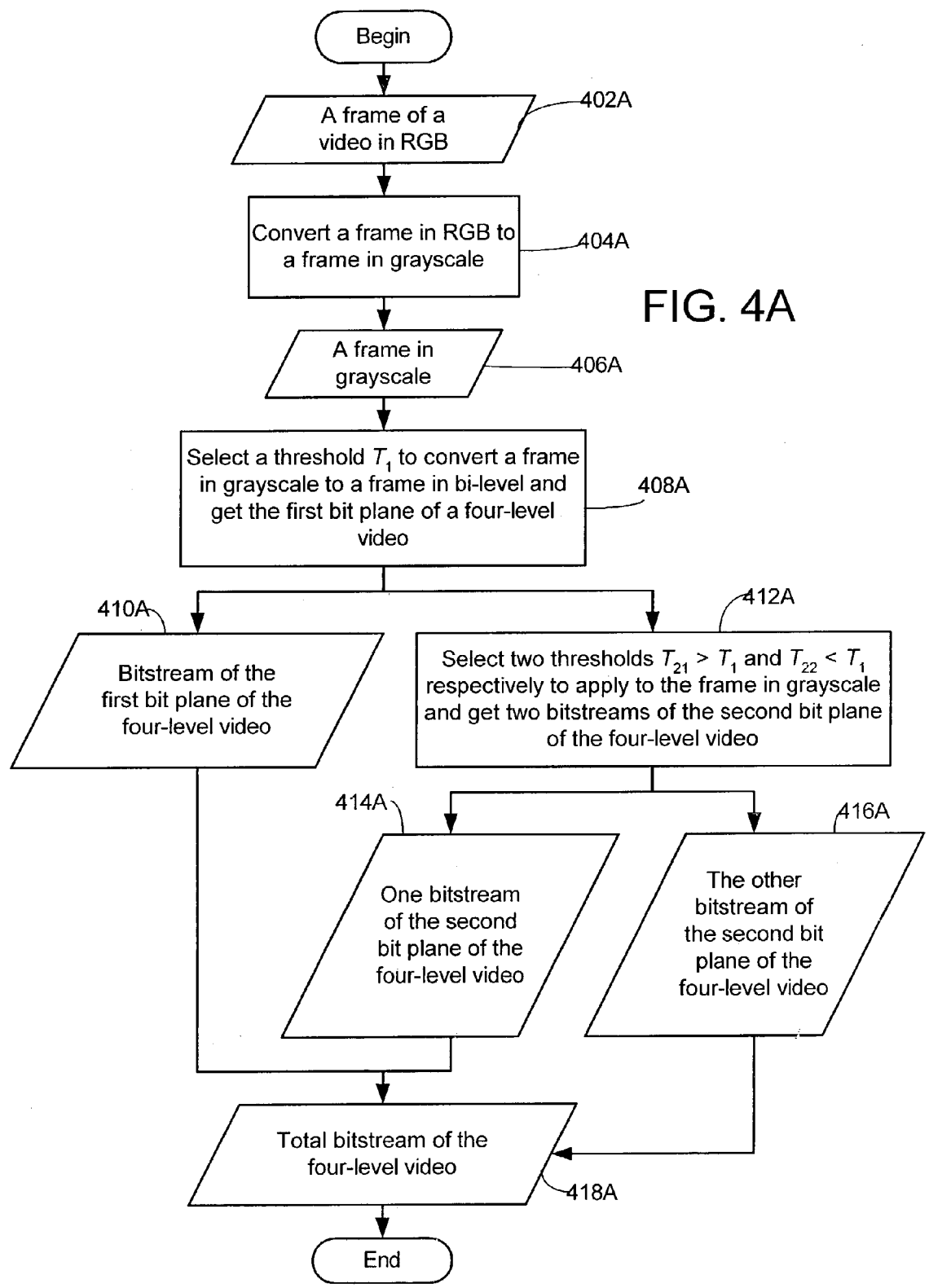
FIG. 4A is a flow diagram depicting the process actions of creating a four-level video.

A process for creating and transmitting a scalable portrait video is shown in FIG. 4A. Initially, a frame of a video in RGB is input (process action 402A). This RGB frame is converted to a frame in grayscale format (process actions 404A and 406A). A threshold $T_1$ is then used to convert the frame in grayscale to a frame in bi-level video format to obtain the first bit plane of a four level video (process actions 408A, 410A). Two thresholds, $T_{21}$ and $T_{22}$, $T_{21} > T_1$ and $T_{22} < T_1$, are applied to the two parts of the grayscale image, $S_1$ and $S_2$ when divided by the principal threshold $T_1$, to obtain two parts of the second bit plane images of the four level video (process actions 412A, 414A, 416A) which are combined (process action 418A). Once encoded these parts will become the two bitstreams of a four-level video.

After reviewing the traditional 256-level grayscale representation of a grayscale image, it was found that it is actually the result of a procedure that divides the image with a threshold of 128, and then further divides the divided parts of the image with thresholds of 192 and 64 respectively, and so on. The difference between the traditional 256-level grayscale representation of an image and the bi-level and four-level representations is that the traditional representation always uses 128 as the threshold of the first division, 192 and 64 as the thresholds of the second division, and so on, but the system and method according to the present invention may not. It is obvious that these threshold values may not be optimal. The first problem that needs to be solved in representing an image with one bit plane is how one can choose the most suitable threshold to divide the original image into two parts that result in a good bi-level image. Also, if one is representing an image with two bit planes one must ascertain how to choose three suitable thresholds to divide the image into four parts that result in a good four-level image, and so on.

Figure 4B:
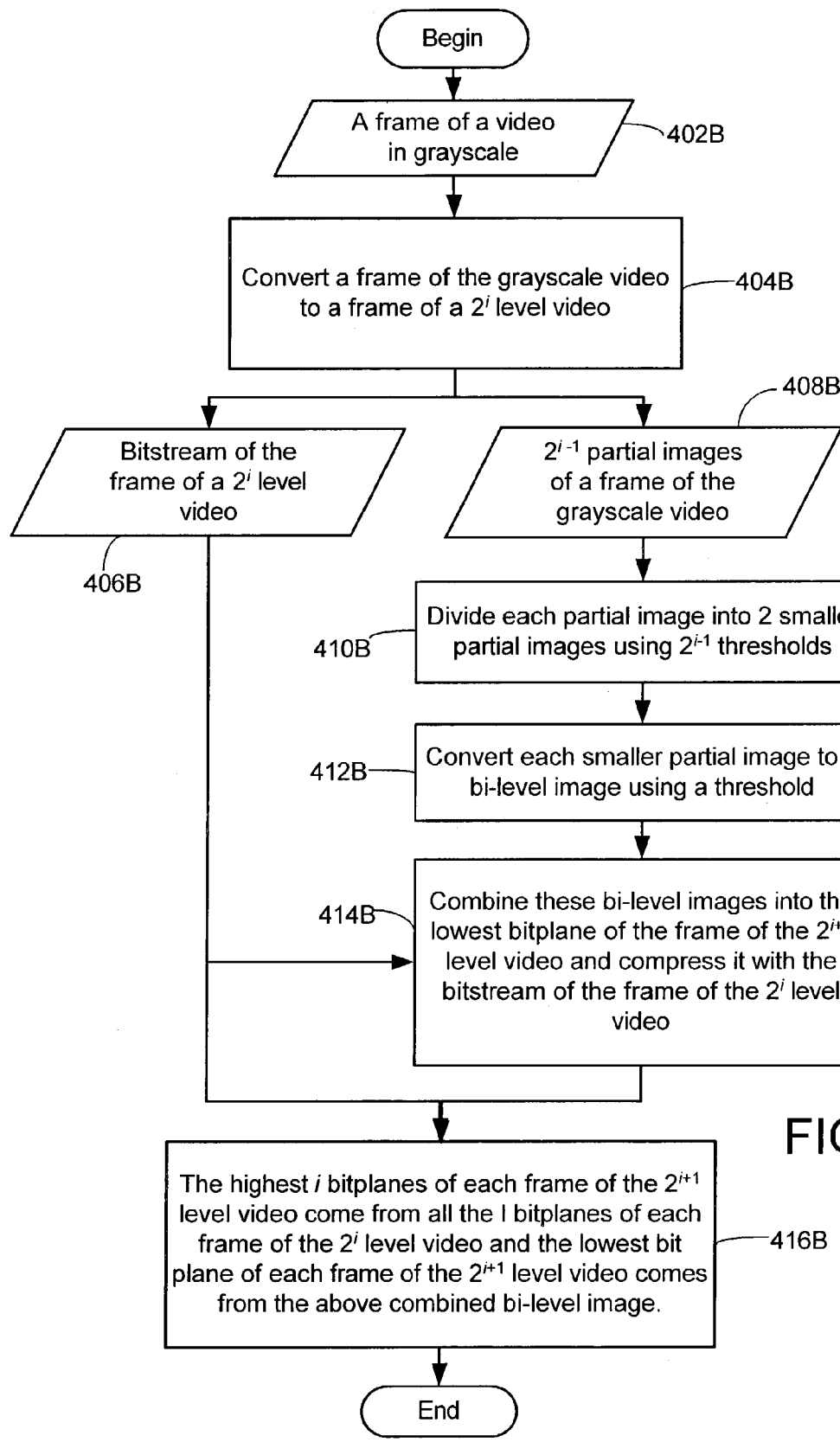
FIG. 4B is a flow diagram depicting how to generate a $2_{i+1}$ level video based on a $2^i$ level video.

As described previously, the second bit plane (e.g. FIG. 3(k)) of a four-level video consists of two parts: one part consisting of pixels of the bi-level image (FIG. 3(i)) generated using the higher threshold; the other part consisting of pixels of the bi-level image (FIG. 3(j)) generated using the lower threshold. Which pixel of the two bi-level images contributes to the second bit plane is determined by the binary value of the pixel in the first bit plane (FIG. 3(d)). Although the second bit plane (FIG. 3(k)) appears complex, its components, FIG. 3(i) and FIG. 3(j) are relatively simple. They are actually bi-level images that are converted from the original image with a higher threshold and a lower threshold respectively. So it can be seen that the coding of the low bit plane of a four-level video is just the combination of the coding of two mutually exclusive bi-level video parts with their thresholds to be chosen at a higher and a lower values respectively. In addition, one does not need to spend extra bits to describe the regions of the video parts since they are defined by the first bit plane of the four-level video. This means that the coding of the low bit plane of a four-level video is as easy as the coding of the high bit plane. The same principles can be extended to more bit planes of a multi-level video (FIG. 4B).

Suppose that one has already converted a grayscale video into a $2^i$ level video, where i is a positive integer (process actions 402B and 404B). In each frame, the whole image is divided into $2^{i-1}$ partial images (process action 408B). In order to generate $2^{i+1}$ level video, each of the $2^{i-1}$ partial images is further divided into 2 smaller partial images (process action 410B) and each resultant smaller partial image is converted into a bi-level image (process action 412B). These bi-level images can be combined into one bi-level image and be encoded with considering the lowest bit plane of the $2^i$ level video (process action 414B). So the highest i bit planes of each frame of the $2^i$ level video come from all the i bitplanes of each frame of the $2^i$ level video (process action 406B) and the lowest bit plane of each frame of the $2^{i+1}$ level video comes from the above combined bi-level image (process action 414B). If not all the partial images of a $2^i$ level video are divided into 2 smaller partial images, the number of level of the resultant video can be between $2^i$ and $2^{i+1}$.

The advantage of the above multi-level video coding is that the transmission of more bit planes always results in the enhancement of the visual quality of the lower level video. For example, if one uses a bi-level video to start, then one wants to switch to four-level video as more bandwidth is available, one needs to only to keep the bi-level video coding for the first bit plane and start coding the second bit plane for the four-level video. If a client receives the bit stream of the second bit plane of the four-level video, then users can see the brighter part of the original bi-level video as having two grayscale levels, as does the darker part. If the bit stream of the second bit plane is lost during transmission, the client can still display a bi-level video using the bit stream of the first bit plane of the four-level video. Moreover, since the first bit plane of a four-level video is just the original bi-level video, it is possible to fade in the second bit plane so that a smooth transition can be reached. The same fading method can be extended to switching between arbitrary levels of video. The property that a video with a higher level always contains all the information of a video with a lower level exactly indicates scalability of the video.

2.3 How to Express an Image into Given Gray Levels

Figure 5:
FIG. 5 depicts 4-level grayscale images (Carphone) without (a) and with (b) optimal thresholds.
Figure 5:

One of the core problems in multi-level video generation is how to express an image using given gray levels. The problem is meaningless if the target number of gray levels approaches 256, i.e. full grayscale levels. However, if the number of gray levels is about 2, or 4, the effects are very obvious as shown in FIG. 5. Besides bandwidth considerations, this issue also has a practical impact in that many mobile phone screens are in 4-level grayscales.

As indicated earlier, the basic approach to expressing an image using given grayscale levels is thresholding. If one wants to convert a grayscale image into a bi-level image, only one threshold is needed. If one wants to express an image in multiple levels, multiple thresholds are needed.

Image thresholding methods are popular techniques in image segmentation. They can be classified into nonparametric approaches (usually solving an optimal problem on some criteria) and parametric approaches, based on the mathematical methods they use. Among methods that use only the gray-level distribution of an image, Ostu's Between-class variance method [5], Entropy methods [6, 7], and the Minimum error method [8] are typical nonparametric methods, and the Moment-preserving method [9] is a typical parametric method. The most famous methods that use local spatial features are two-dimensional thresholding methods [10, 11] and a multi-dimension method [12]. While any thresholding method could be adopted for use in the present scalable portrait video system process, tested embodiments employed in Ostu's Between-class variance method [5] because it is superior in its uniformity measure and shape measure for most types of images [13]. Ostu's method essentially chooses the optimal thresholding values to maximize variances between gray level classes.

Suppose it is desired to convert an image with L (usually 256) gray levels into M(<L) gray-levels. Let $b_1, b_2 \ldots b_M$ be the principal gray-levels and let f(x, y) denote the gray level of the pixel in position (x, y). If the multi-threshold value vector is $(T_1 \ldots T_{M-1})$, the multi-thresholding procedure is as follows:

$$f_r(x, y) = b_i, \text{ if } f(x, y) \in C_i, i=1, 2, \ldots M \quad (1)$$

where the M gray level ranges are:

$$C_1 = [1, \ldots, T_1 - 1], \quad (2)$$

$$\ldots$$

$$C_i = [T_{i-1}, \ldots, T_i - 1],$$

$$\ldots$$

$$C_M = [T_{M-1}, \ldots, L]$$

The probability of the gray level i is:

$$p_i = \frac{f_i}{N}, \quad i = 1, \ldots, L \quad (3)$$

where $f_i$ is the frequency that the gray level i occurs in the image, N is the total number of pixels in the image. So the probability distributions for M gray level classes are $$\frac{p_j}{\omega(i)},$$

where $$\omega(i) = \Sigma p_j, j \in C_i, i=1, \ldots M \quad (4)$$

The between-class variance of the Mclasses is defined using discriminant analysis:

$$\sigma_B^2 = \sum_{i=1}^{M} \omega(i)(\mu(i) - \mu_T)^2, \quad (5)$$

where the total gray level expectation $$\mu_T = \sum_{i=1}^{L} i p_i, \quad (6)$$

and the ith gray level range expectation $$\mu(i) = \sum j \frac{p_j}{\omega(j)}, \quad j \in C_i \quad (7)$$

The optimal thresholds vector is selected by maximizing $\sigma_B^2$ $$(T_1 \ldots T_{M-1}) = \text{Arg Max}\{\sigma_B^2\} \quad (8)$$

The time consumed for exhaustive search in the threshold vector space increases as $O(L^{M-1})$. So the multi-thresholding method is very time consuming if M is large. Liao et al. [14] utilized a recursive algorithm and a look up table to accelerate Ostu's method and has avoided a large amount of repeated calculations.

Figure 6:
FIG. 6 depicts one frame of a full grayscale video and its bi-level and four-level images generated using Ostu's method.
Figure 6:
Figure 6:

FIG. 6 shows one frame of a full gray scale video (Salesman) and its bi-level and four-level images generated using Ostu's method. For the sake of scalability, in four-level video, instead of using Ostu's multiple thresholding method, Ostu's single thresholding method was recursively used on the image and its divided parts, i.e. first Ostu's single thresholding method was used on the whole image to get a threshold for the generation of the first bit plane, then Ostu's single thresholding method was applied to two divided parts of the image respectively. For $2^i$ level video (where $i \geq 3$), thresholds are determined by equal subdivision beginning with the third bit plane. The above method as an automatic threshold generation method is useful for the conversion of large video clips into a given number of grayscale levels.

Figure 7:
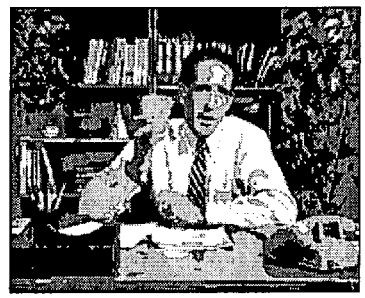
FIG. 7 depicts two four-level images generated using Ostu's method (a) and our empirical method (b).
Figure 7:

In video communications, although the threshold calculated by an automatic thresholding method may be optimal to the whole scene, it may not be optimal to the face that is paid the most attention to. In these cases, users are allowed to fine tune the threshold. While it is easy for a user to adjust one threshold in a bi-level video, it has been shown that the user can also adjust multiple thresholds in a multiple-level video. For bi-level videos, users are allowed to adjust one threshold. For four-level videos, after a large amount of experiments on faces of different races and with different lighting conditions, an empirical method to adjusting the thresholds was found. The method is that users are allowed to adjust the threshold of the first bit plane, called the principal threshold, of a four-level video, and then the higher threshold and the lower threshold for the second bit plane are always set as the principal threshold plus and minus a prescribed number, 16 in a tested embodiment of the present invention. As shown in FIG. 7 the visual quality of a four-level image that is generated using the empirical method (b) of the system and method according to the present invention is better than that generated using Ostu's method (a).

2.4 Four-level Video Coding

Four-level video coding is actually a combination of bi-level video coding. First, the coding process of bi-level video is briefly reviewed (please refer to [1] for details). In the coding stage of a bi-level video, each binary pixel is coded in raster order. The process for encoding a given pixel is: (a) computing a context number; (b) indexing a probability table using the context number; and (c) using the indexed probability to drive an arithmetic coder. When the final pixel has been processed, the arithmetic code is terminated.

Each frame can be compressed with a context-based arithmetic encoder (CAE) in intra or inter mode. Both modes result in the generation of a single binary arithmetic codeword. The various coding modes are characterized by their context computation and the probability table used.

Figure 8:
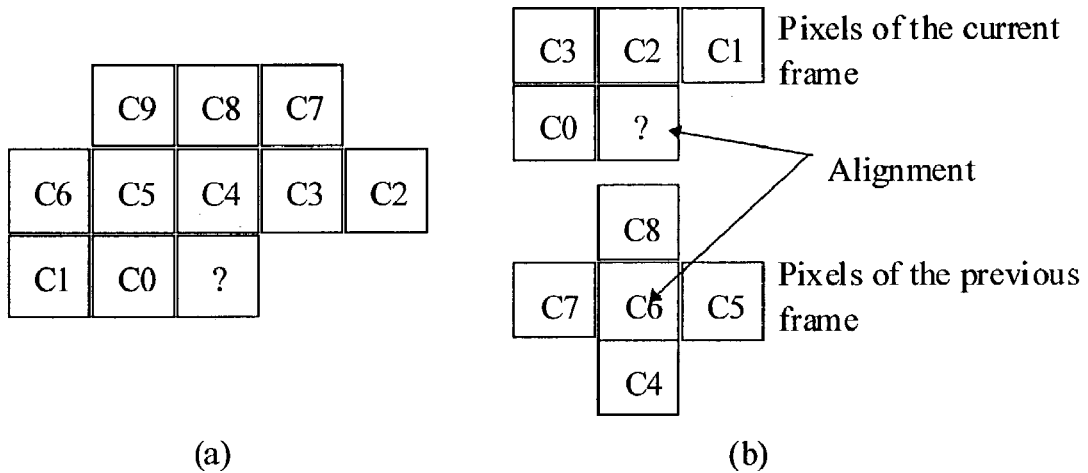
FIG. 8 depicts (a) The intra template and context construction. (b) The inter template and context construction. The pixel to be coded is marked with '?'.

In this module, the same template and context construction scheme as those in MPEG4 are applied. In detail, for intra coded frames, a 10-bit context $$C = \sum_k c_k \cdot 2^k$$

is built for each pixel as illustrated in FIG. 8(a). And for inter coded frames, temporal redundancy is exploited by using pixels from the previous frame to make up part of the context. Specifically, a 9-bit context $$C = \sum_k c_k \cdot 2^k$$

is built as illustrated in FIG. 8(b). When building contexts, any pixels to the left of or above the bounding box of the current frame are assumed to be zero. In the coding of four-level video, the coding of the first bit plane (as in FIG. 3(d)) is just the same as the coding of a bi-level image sequence. The threshold is chosen using methods described in Section 2.3. As indicated previously, the second bit plane (as in FIG. 3(k)) is the combination of the two images created by applying $T_1$ to the original image using image sequences (as in FIG. 3(i) and FIG. 3(j)) that are generated from the original image with a higher threshold and a lower threshold respectively. These thresholds are applied to the two parts of the grayscale image respectively to produce the two parts of the second bit plane. Suppose $T_1$ is the threshold for the first bit plane, i.e. the principal threshold. $T_1$ divides the grayscale image f(x, y) into two parts: $S_1$ and $S_2$ $$S_1 = \{(x, y)|f(x, y) \geq T_1\} \quad (9)$$

and $$S_2 = \{(x, y)|f(x, y) < T_1\} \quad (10)$$

Figure 9:
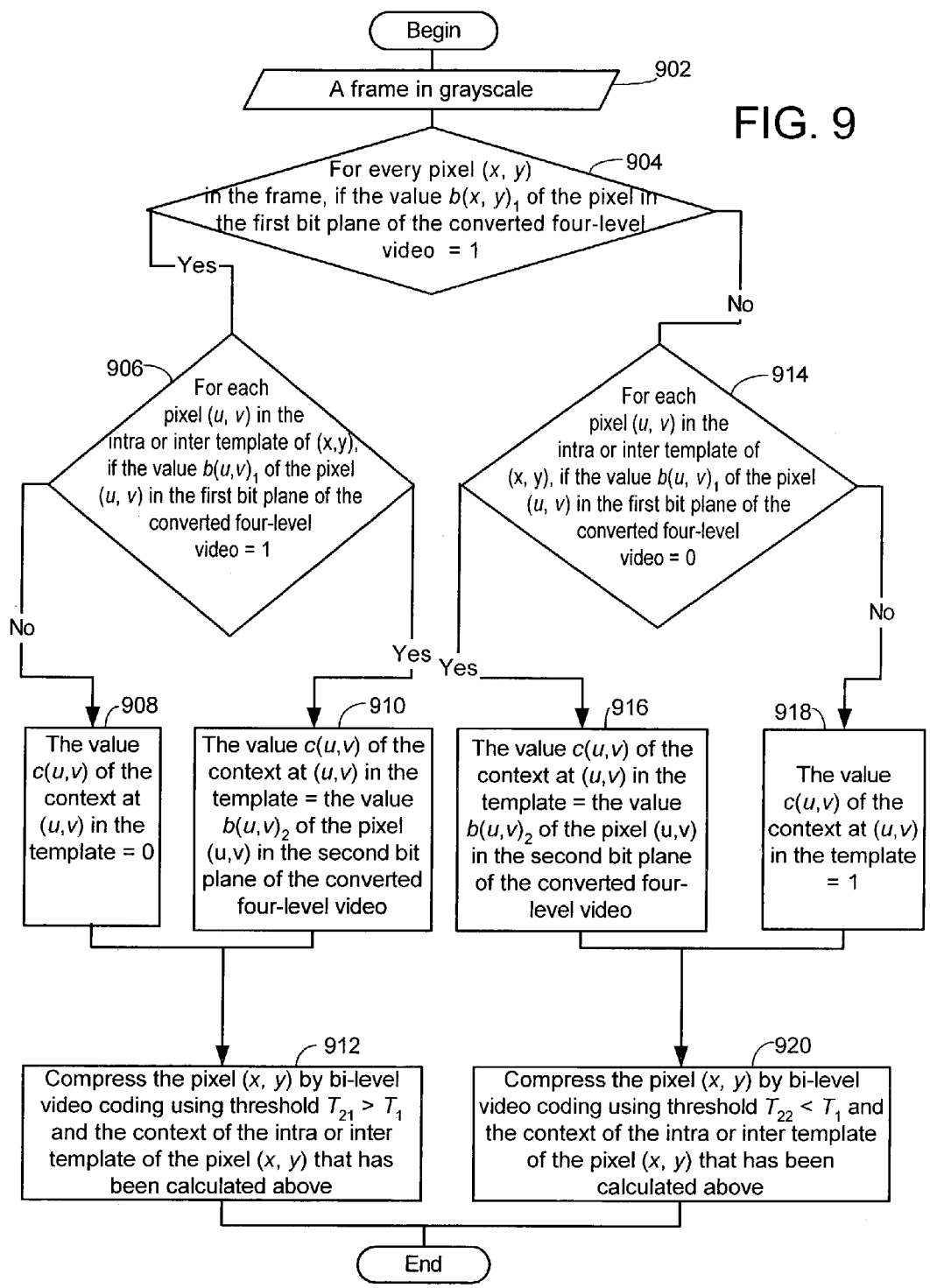
FIG. 9 is a flow diagram depicting the process actions of encoding a four level video.

Suppose $T_{21}$ is the threshold applied to $S_1$ for the generation of part of the second bit plane of the four-level video, and $T_{22}$ is the threshold applied to $S_2$ for the generation of the other part of the second bit plane. Assume that b(x, y), is an array of two-bit elements that is used to record the resultant four-level image where i=1 corresponds to the first bit plane and i=2 corresponds to the second bit plane. The feature of the coding of the second bit plane b(x, y)$_2$ of a four-level video is that when a pixel (x, y) is coded, it is necessary to first determine whether it belongs to $S_1$ or $S_2$. Its context for the intra or inter template should consist of pixels in the corresponding bi-level image (as in FIG. 3(i)) derived from $S_1$ or the corresponding bi-level image (as in FIG. 3(j)) derived from $S_2$. Only by this can the compression of the second bit plane of a four-level video be made as simple as that of the first bit plane. The algorithm for calculating the context of the intra or inter template of pixel (x, y) is as follows:

If b(x, y)$_1$=1, i.e. f(x, y)≧$T_1$, i.e. (x, y)∈$S_1$
    For each pixel (u, v) in the intra or inter template of (x, y)
        If b(u, v)$_1$=1
            The binary value of (u, v) in the template c(u, v)= b(u, v)$_2$
        Else
            c(u, v)=0
        End if
    End for
Else
    For each pixel (u, v) in the intra or inter template of (x, y)
        If b(u, v)$_1$=0
            c(u, v)=b(u, c)$_2$
        Else
            c(u, v)=1
        End if
    End for
End if Thus, as outlined in FIG. 9, the second bit plane is encoded as follows. As mentioned previously, and image frame in grayscale in input into the threshold selection process (process action 902). Every pixel location in the frame is checked to see if the value of the pixel in the first bit plane of the converted video is equal to one (process action 904). If it is so, each pixel (u, v) in the intra or inter template of (x, y) is checked to see if the value b(u, v) of the pixel (u, v) in the first bit plane of the converted four-level video=1 (process action 906). If this not so, the value c(u, v) of the context at (u, v) in the template=0 (process action 908). If it is so, the value c(u, v) of the context at (u, v) in the template is set equate to the value b(u, v)$_2$ of the pixel (u, v) in the second bit plane of the converted four-level audio (process action 910). The pixel is then compressed by bi-level video coding using threshold $T_{21}>T_1$ (process action 912).

Referring back to process action 904, if the first bit plane of the converted four-level video is not equal to one, each pixel (u, v) in the intra or inter template of (x, y) is checked to see if the value b(u, v) of the pixel (u, v) in the first bit plane of the converted four-level video=0 (process action 914). If this not so, the value c(u, v) of the context at (u, v) in the template=1 (process action 918). If it is so, the value c(u, v) of the context at (u, v) in the template is set equate to the value b(u, v)$_2$ of the pixel (u, v) in the second bit plane of the converted four-level audio (process action 916). The pixel is then compressed by bi-level video coding using threshold $T_{22}<T_1$ (process action 920).

As an effective bit rate reduction method in bi-level video coding, a threshold band is also applied in each coding process of a four-level video. For pixels with their gray levels within the threshold band, their bi-level values can be modified according to the prediction of the adaptive context-based arithmetic encoding.

TABLE 1

THE BIT RATES OF THE SECOND BIT PLANES OF SOME TESTING VIDEO CLIPS USING AN INTUITIVE METHOD AND THE SCALABLE PORTRAIT VIDEO METHOD.

| Video name | Intuitive method (bps) | Scalable Portait Video Method (bps) | Reduced |
|---|---|---|---|
| Akiyo | 13030 | 11591 | 11.0% |
| Salesman | 25082 | 21688 | 13.5% |
| Missbm | 14523 | 12684 | 12.7% |

Table 1 shows the bit rates of the second bit planes of some standard testing video clips using an intuitive method and the scalable portrait video system and method. In the intuitive method, the context for the intra or inter template of a pixel in context-based arithmetic coding is retrieved only from the current bit plane while in the scalable portrait video method, the context is determined with taking into account its preceding bit planes as described above. The scalable portrait video method reduces the bit rates of the second bit planes by about 11–13%. The reduction will be more significant in videos with more levels.

TABLE 2

THE BIT RATE OF EACH BIT PLANE IN FOUR-LEVEL VIDEOS

| Video Name | First bit plane (bps) | Second bit plane (bps) | Ratio |
| --- | --- | --- | --- |
| Akiyo | 7148 | 11591 | 1.62 |
| Salesman | 14693 | 21688 | .48 |
| Missbm | 7336 | 12684 | .73 |

Table 2 shows the bit rates of each bit plane in a four-level video generated by the scalable portrait video system and method. Surprisingly, the total bit rate of the second bit plane is about 1.4–1.7 times of that of the first bit plane. Intuitively, since the bit stream of the second bit plane (as in FIG. 3($k$)) is the combination of the bit streams from mutually exclusive regions in two bi-level videos (as in FIG. 3($i$) and FIG. 3($j$)) and the total area is the same as that of the first bit plane, the bit rate of the second bit plane should be almost the same as that of the first bit plane. In order to investigate this phenomena, bit rates from different regions of the two bi-level videos were counted. The significant region was defined as the region in the two bi-level videos that contributes bits to the second bit plane of the four-level video, e.g. the region in FIG. 3($i$) marked by brighter pixels in FIG. 3($d$) and the region in FIG. 3($j$) marked by darker pixels in FIG. 3($d$). The insignificant region was defined as the region in the two bi-level videos that does not contribute bits to the second bit plane of the four-level video, e.g. the region in FIG. 3($i$) marked by darker pixels in FIG. 3($d$) and the region in FIG. 3($j$) marked by brighter pixels in FIG. 3($d$)). The bit rates of significant regions and insignificant regions in the bi-level videos (as in FIG. 3($i$) and FIG. 3($j$)) of the Akiyo video clip are shown in Table 3. The sum of the bit rates of the significant regions in the two bi-level videos is exactly the bit rate of the second bit plane of the four-level video. In this table, it is found that the bit rates of the significant regions are much higher than that of the insignificant regions while the total bit rate (list at the third column of the table) of each bi-level video is similar to that of the first bit plane of the four-level video (see Table 1). The reason is that the values of the pixels in the insignificant region can be determined from the first bit and are equal to a same value (0 in FIG. 3($i$) and 1 in FIG. 3($j$)), while the significant region possesses higher complexity and accumulates most of the entropy of the image. Since the second bit plane collects the complexity of both of the bi-level videos, it consumes more bits.

TABLE 3

THE BIT RATES OF SIGNIFICANT AND INSIGNIFICANT REGIONS IN THE TWO BI-LEVEL VIDEOS OF AKIYO VIDEO CLIP

| | Significant region | Insignificant region | Sum |
| --- | --- | --- | --- |
| Bi-level video with higher threshold | 5791 | 1267 | 7058 |

TABLE 3-continued

THE BIT RATES OF SIGNIFICANT AND INSIGNIFICANT REGIONS IN THE TWO BI-LEVEL VIDEOS OF AKIYO VIDEO CLIP

| | Significant region | Insignificant region | Sum |
| --- | --- | --- | --- |
| Bi-level video with lower threshold | 5800 | 1342 | 7142 |
| Sum | 11591 | 2609 | 14200 |

After careful study, it was found that the bit rate of the second bit plane can be further reduced. As shown in FIG. 3, when the two bi-level image sequences of the second bit plane were coded, the possibility table actually is trained using both the significant region and insignificant region. While the significant region characterizes the features of the image content, the insignificant region dilutes it. Therefore the resultant possibility tables are not efficient. By only training the tables on the significant regions, the resultant bit rates were reduced by about 4–7% (see Table 4).

TABLE 4

THE IMPROVEMENT OF THE BIT RATES OF THE SECOND BIT PLANE

| Video name | On the whole page image (bps) | On the significant region only (bps) | Reduced |
| --- | --- | --- | --- |
| Akiyo | 11591 | 11012 | 5.0% |
| Salesman | 21688 | 20696 | 4.6% |
| Missbm | 12684 | 11771 | 7.2% |

2.5 Multiple Level Video Coding

The coding of four-level video can be easily extended to the coding of multiple-level video. From the third bit plane of a multiple-level video, thresholds are chosen by equal subdivision between thresholds in the preceding bit planes. If the grayscale level of an image region cannot be further divided in some high level videos, the dividing stops. This situation can also be detected by the decoder and will not affect decoding. In addition, the context of an intra or inter template in a certain bit plane can also be determined with regard to its preceding bit planes. Finally, the coding of the ith bit plane ($i \geq 1$) is just the combination of the coding of $2^{i-1}$ bi-level video parts. The total computational cost of a $2^i$ level video is about i times of that of a bi-level video.

Figure 10:
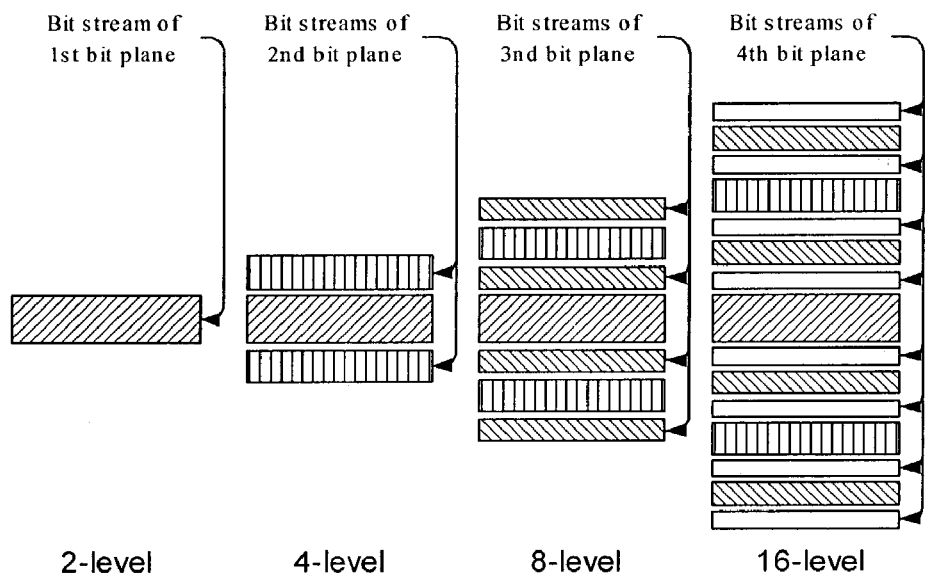
FIG. 10 depicts the bit streams of multi-level videos.

FIG. 10 shows the bit streams of each bit plane of multi-level videos. The bit streams of different bit planes are shown with different patterns and these bit streams are ordered from top to bottom just as the positions of the thresholds that are used to generate them. When the coded bits of a frame are output, they are output in independent bit streams. For example, the bits of each frame of an 8-level video consists of one bit stream for the first bit plane, two bit streams for the second bit plane and four bit streams for the third bit plane. Each bit stream corresponds to a bi-level video part that is converted from certain gray level region of the original grayscale video using a certain threshold. Bit streams in each bit plane do not affect each other. This results in a very good property in error resilience. It can be seen that each higher level video contains all the bit stream of a lower level video. Each bit stream of a higher bit plane details the gray levels represented by a bit stream in its lower bit plane.

Figure 11:
FIG. 11 depicts frames of an 8-level video without (a) and with (b) downsampling in the third bit plane.
Figure 11:

In order to further reduce the bit rates of bit planes from the third bit plane, a downsampling method is introduced. An image is divided into 2×2 pixel blocks. If values of the 4 pixels in all bit planes that are higher than the current bit plane (at least the third bit plane) are the same, the average binary value in the current bit plane of the 4 pixels is regarded as the binary value of all the 4 pixels in the current bit plane. When pixels are coded in raster order, the binary values of all the other 3 pixels in the current bit plane are predicted but not coded except that of the bottom-right one. The average binary value of the four pixels in the current bit plane is calculated when the bottom-right one is coded. It is not necessary to spend bits to indicate these special blocks since they can be identified in the decoder by the same information on the higher bit planes. Inversely, the binary values of all the other 3 pixels in the current bit plane are not set until the bottom-right pixel is decoded. FIG. 11 shows the images without and with downsampling in the third bit plane of an 8-level video. The visual effects are almost the same, but the total bit rate is reduced from 66846 bps (a) to 54903 bps (b).

Figure 12:
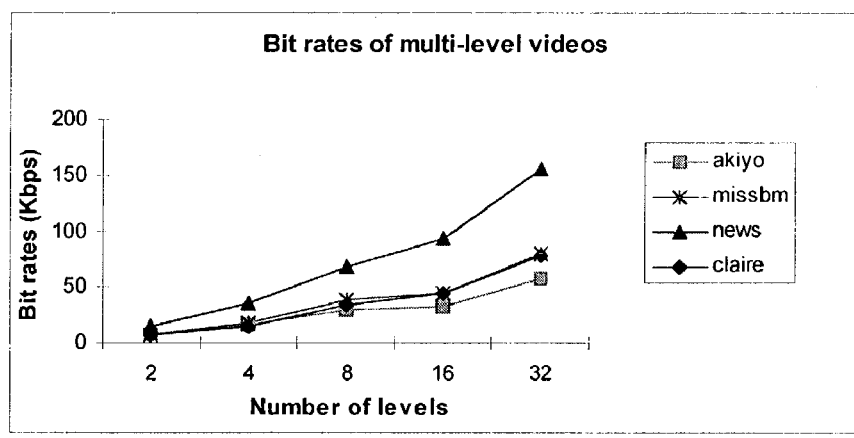
FIG. 12 depicts the bit rates of multi-level videos.

The bit rate distributions of multi-level videos with different grayscale levels are shown in FIG. 12. The bit rate of a $2^{i+1}$ level video is about 2.4 times of that of a $2^i$ level video (where $i \geq 1$). If the number of levels of a multi-level video is greater than 4, its compression ratio is no longer competitive with that of DCT-based methods. In video communication applications, usually bi-level, tri-level and four-level videos are used to cover the 10–40 Kbps bandwidth range in 2.5G wireless networks. In some network conditions where bandwidths vary significantly, if the applications, e.g. security monitoring, require uninterrupted switches between low quality and high quality videos, multi-level videos with all grayscale levels are used, otherwise the switch is made to traditional full-color video.

2.6 Multi-level Video Transmission

Figure 13:
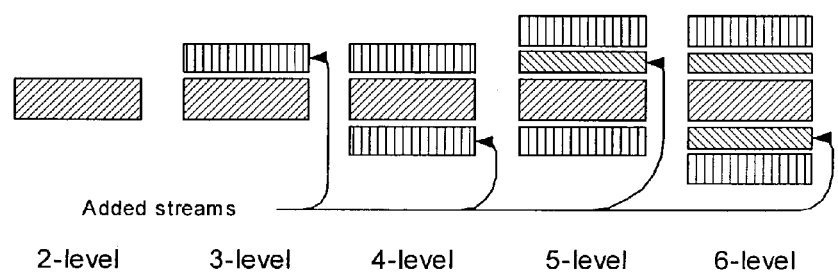
FIG. 13 depicts how the gray levels of a multi-level video can be increased or decreased by one.

In video streaming (video broadcast) applications, a full grayscale video can be encoded into a multi-level video in advance while in video communication applications, the captured video is encoded in real-time according to demands. For a given bandwidth, corresponding levels of a video can be sent. If the bandwidth changes, the number of the video levels can be increased or decreased. Besides increasing or decreasing the number of video levels directly from $2^i$ to $2^{i+1}$ (where $i \geq 1$) or from $2^i$ to $2^{i-1}$ (where $i \geq 2$), it is also possible to increase or decrease the number of video levels from j to j+1 (where $j \geq 2$) or j to j−1 (where $j \geq 3$) (see FIG. 13 since the bit stream corresponding to each threshold in a bit plane is independent and can be exported individually. This makes the transition of videos between different levels smoother and fits the video into the given bandwidth more precisely. As indicated in FIG. 13 when it is necessary to increase the number of gray levels of a video, the streams are usually added with their corresponding thresholds sorted from the principal threshold to the two sides. This is because gray levels near the principal threshold usually represent richer contents of the image.

Figure 14:
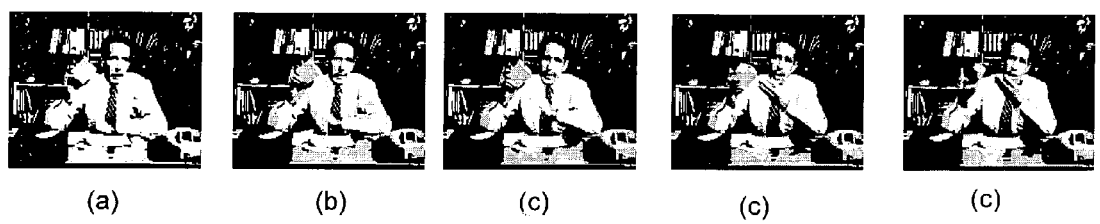
FIG. 14 depicts the fading in effects in a switch from a bi-level video to a tri-level video.

Another method that can be used to make a smoother transition of videos between different levels is fading in (when the number of video levels increases) or fading out (when the number of video levels decreases). This method depends on the full grayscale capability of the display. For example, when a greater bandwidth exists and the system begins switching a bi-level video to a tri-level video, instead of immediately displaying the tri-level video, the bi-level video is faded into. Since the first bit plane of the tri-level video is actually the original bi-level video, the original bi-level video is available to complete the fading in operation when a tri-level video is being received. The effects are that the brighter areas of a bi-level video are unintentionally displayed in two levels of brightness in about 1–2 seconds (see FIG. 14). When a switch from a tri-level video to a bi-level video is made, the fading out operation is not so easy, since when a bi-level video is being received, the tri-level video is no longer available to complete the fading out operation. In some cases, a solution is that when the available bandwidth of a network decreases, a bi-level video is not immediately switched to, but instead the sender sends a fading out signal to the receiver, which means to start fading out while continuing to send the tri-level video for 1–2 seconds. This gives the receiver the time and resources to complete the fading out operation before displaying the pure bi-level video.

The multi-level video according to the present invention is called portrait video because the coding is ordered from outlines to details, and the videos with lower levels look like a portrait. Much different from DCT-based coding methods, which put first priority on the average colors of a scene, portrait video puts first priority on the outline of a scene and then adds more details to it if more levels are involved. In some sense, portrait video always delivers the most important information of a scene for a given bandwidth. Portrait video is scalable because each video of a higher level always contains all the information of the video of a lower level and enhances the lower level videos.

The portrait video scheme possesses a number of features. Suitable thresholds for ordinary scenes are selected based on Ostu's Between-class variance method, and allow users to fine tune in video communication scenarios with the assistance of the empirical method of the present invention. These methods ensure that more important information of a scene is included in lower bit planes, which will be transmitted with high priority. By analyzing the composition of each bit plane of a multi-level video, the compression of noisy bit planes is converted to the compression of several regular bi-level video parts, thereby greatly improving the compression ratio. This also results in multiple independent bit streams, which facilitate the switch between videos with different levels and error corrections. Moreover, a series of methods including improved possibility table training, downsampling, fading in and fading out are designed to ensure efficient compression and a smooth transition of portrait videos.

While the present method can also be applied to general bit plane coding in other image processing and video compression technologies, it is particularly promising in mobile video conferencing on 2.5G wireless networks. This is because the bandwidths of 2–4 level portrait videos fit into the bandwidth range of 20–40 Kbps that GPRS and CDMA 1X can stably provide, and the cheap computational costs of 2–4 level videos are affordable by mobile devices.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Jiang Li, Gang Chen, Jizheng Xu, Yong Wang, Hanning Zhou, Keman Yu, King To Ng and Heung-Yeung Shum, "Bi-level Video: Video Communication at Very Low Bit Rates," ACM Multimedia Conference 2001, Sep. 30–Oct. 5, Ottawa, Ontario, Canada, pages 392–400.

[2] ISO/IEC JTC1/SC29/WG11 N3312 Coding of moving pictures and audio March 2000/Noordwijkerhout.

[3] ITU-T Recommendation H.261 Video codec for audio-visual services at p×64 kbit/s, 03/93.

[4] ITU-T Recommendation H.263 Video coding for low bit rate communication, 02/98.

[5] N. Ostu, A threshold selection method from gray-level histogram, IEEE Trans. Systems Man Cybernet. SMC-8, 1978, 62–66.

[6] T. Pun, A new method for gray-level picture thresholding using the entropy of the histogram, Signal Process. 2, 1980, 223–237.

[7] J. N. Kapur, P. K. Sahoo, and A. K. C. Wong, A new method for graylevel picture thresholding using the entropy of the histogram, Comput. Vision Graphics Image Process. 29, 1985, 273–285.

[8] J. Kittler and J. Illingworth, Minimum error thresholding, Pattern Recognit. 19, 1986, 41–47.

[9] W. H. Tsai, "Moment-preserving thresholding: a new approach,", Computer Vision, Graphics, and Image Processing, Vol. 29, 1985, pp. 377–393.

[10] R. L. Kirby and A. Rosenfeld, A note on the use of (gray-level, local average gray level) space as an aid in the thresholding selection, IEEE Trans. Systems Man Cybernet. SMC-9, 1979, 860–864.

[11] A. D. Brink. Thresholding of digital images using two-dimensional entropies. Pattern Recognition 25. 1992, 803–808.

[12] N. Papamarkos and A. Atsalakis, "Gray-level reduction using local spatial features," Comput. Vision Image Understanding, vol. CVIU-78, 2000, pp. 336–350.

[13] P. K. Sahoo, S. Soltani, and A. K. C. Wong, "A survey of thresholding techniques", Computer Vision Graphics Image Processing. 41, 1988, 233–260.

[14] P. Liao, T. Chen and P. Chuang, "A Fast Algorithm for Multilevel Thresholding", Journal of Information Science and Engineering 17, 2001, 713–727.

What is claimed is:

1. A system for generating portrait video, the system comprising:
   a general purpose computing device; and
   a computer program comprising program modules executable by the computing device, wherein the computing device is directed by the program modules of the computer program to,
   obtain a frame of a video in grayscale format;
   apply a first threshold $T_1$ to said grayscale frame to generate two partial grayscale images, a first of which, $S_1$, comprises pixels the non-zero valued ones of which have values greater than said first threshold $T_1$, and a second of which, $S_2$, comprises pixels the non-zero valued ones of which have values less than said first threshold $T_1$;
   generate a first bi-level image comprising pixels assigned a first binary value whenever the value of the correspondingly located pixel in the grayscale frame exceeds $T_1$, and comprising pixels assigned a second binary value whenever the value of the correspondingly located pixel in the grayscale frame is less than $T_1$;
   apply a second threshold $T_{21}$ to the first partial grayscale image, $S_1$, to generate a second bi-level image comprising pixels assigned a first binary value whenever the value of the correspondingly located pixel in the first partial grayscale image exceeds $T_{21}$ and pixels assigned a second binary value whenever the value of the correspondingly located pixel in the first partial grayscale image is less than $T_{21}$;
   apply a threshold $T_{22}$ to the second partial grayscale image, $S_2$, to generate a third bi-level image comprising pixels assigned a first binary value whenever the value of the correspondingly located pixel in the second partial grayscale image exceeds $T_{22}$ and pixels assigned a second binary value whenever the value of the correspondingly located pixel in the second partial grayscale image is less than $T_{22}$; and
   combine the first, second and third bi-level images to create a four level grayscale video frame representing a frame of the portrait video by:
      combining the second and third bi-level images by adding the pixel values of corresponding pixel locations of these images to create a combined bi-level image;
      generating an array of two bit elements wherein each element corresponds to a different pixel location of said bi-level images, said elements comprising a most significant bit taken from the associated pixel location of the first bi-level image and a least significant bit taken from the associated pixel location of the combined bi-level image; and
      assigning a different gray scale level to each possible element value.

2. The system of claim 1 wherein $T_{21}<T_1$ and $T_{22}<T_1$.

3. The system of claim 1 wherein said grayscale frame is obtained by
   inputting a frame from a color video; and
   converting the color video frame to grayscale.

4. The system of claim 1 wherein said pixels of said first partial grayscale image $S_1$ also include ones having values equal to $T_1$ and wherein said pixels of said first bi-level image include ones assigned the first binary value whenever the correspondingly located pixels in the grayscale frame are equal to $T_1$.

5. The system of claim 1 wherein said pixels of said first partial grayscale image $S_1$ also include ones having values equal to $T_1$ and wherein said pixels of said first bi-level image include ones assigned the second binary value whenever the correspondingly located pixels in the grayscale frame are equal to $T_1$.

6. The system of claim 1 wherein said pixels of said second bi-level image include ones assigned the first binary value whenever the value of the correspondingly located pixels in $S_1$ is equal to $T_{21}$.

7. The system of claim 1 wherein said pixels of said second bi-level image include ones assigned the second binary value whenever the value of the correspondingly located pixels in $S_1$ is equal to $T_{21}$.

8. The system of claim 1 wherein said pixels of said third bi-level image include ones assigned the first binary value whenever the value of the correspondingly located pixels in $S_1$ is equal to $T_{22}$.

9. The system of claim 1 wherein said pixels of said third bi-level image include ones assigned the second binary value whenever the value of the correspondingly located pixels in $S_1$ is equal to $T_{22}$.

10. The system of claim 1 wherein said pixels of said second partial grayscale image $S_2$ also include ones having values equal to $T_1$.

11. The system of claim 1 wherein said first threshold $T_1$ is set by a user; and wherein said second threshold $T_{21}$ is set to $T_1$ plus a prescribed number; and wherein said third threshold $T_{22}$ is set to $T_1$ minus a prescribed number.

12. The system of claim 11 wherein said prescribed number is 16.

13. The system of claim 1 wherein Ostu's single thresholding method is applied to the grayscale frame to obtain the optimal threshold value for $T_1$; and wherein Ostu's single threshold ing method is applied to the first and second partial grayscale images, $S_1$ and $S_2$, to obtain the optimal threshold values of $T_{21}$ and $T_{22}$.

14. A system for generating portrait video, the system comprising:
a general purpose computing device; and
a computer program comprising program modules executable by the computing device, wherein the computing device is directed by the program modules of the computer program to,
obtain a frame of a video in grayscale format;
apply a first threshold $T_1$ to said grayscale frame to generate two partial grayscale images, a first of which, $S_1$, comprises pixels the non-zero valued ones of which have values greater than said first threshold $T_1$, and a second of which, $S_2$, comprises pixels the non-zero valued ones of which have values less than said first threshold $T_1$;
generate a first bi-level image comprising pixels assigned a first binary value whenever the value of the correspondingly located pixel in the grayscale frame exceeds $T_1$, and comprising pixels assigned a second binary value whenever the value of the correspondingly located pixel in the grayscale frame is less than $T_1$;
apply a second threshold $T_{21}$ to the first partial grayscale image, $S_1$, to generate a second bi-level image comprising pixels assigned a first binary value whenever the value of the correspondingly located pixel in the first partial grayscale image exceeds $T_{21}$ and pixels assigned a second binary value whenever the value of the correspondingly located pixel in the first partial grayscale image is less than $T_{21}$;
apply a threshold $T_{22}$ to the second partial grayscale image, $S_2$, to generate a third bi-level image comprising pixels assigned a first binary value whenever the value of the correspondingly located pixel in the second partial grayscale image exceeds $T_{22}$ and pixels assigned a second binary value whenever the value of the correspondingly located pixel in the second partial grayscale image is less than $T_{22}$; and
encode the first bi-level image,
encode the second bi-level image;
encode the third bi-level image; and
combine the first, second and third bi-level images to create a four level grayscale video frame representing a frame of the portrait video.

15. The system of claim 14 further comprising program modules to:
transmit the first, second and third bi-level images.

16. The system of claim 14 wherein:
if an available bandwidth is too small to transmit the first, second and third encoded bi-level images, then just the encoded first bi-level image is transmitted; and
if sufficient bandwidth becomes available, then the encoded second and third bi-level images are transmitted to display more grayscale levels than available with said first bi-level image alone.

17. The system of claim 14 wherein:
if an available bandwidth is large enough, then the encoded first, second and third bi-level images are transmitted to display more grayscale levels than available with said first bi-level image; and
if sufficient bandwidth to transmit the first, second and third bi-level images becomes no longer available, then only the encoded first bi-level image is transmitted.

18. The system of claim 16 wherein said encoded second and third bi-level video frames are transmitted by fading them in to the first bi-level video transmission when sufficient bandwidth becomes available to transmit them.

19. The system of claim 17 wherein said encoded second and third bi-level video frames are no longer transmitted by fading them out while retaining the first bi-level video transmission when the sufficient bandwidth is no longer available to transmit them.

20. The system of claim 16 wherein said bandwidth is too small to transmit the first, second and third bi-level images if it is less than about 20 Kbps.

21. The system of claim 17 wherein said bandwidth becomes sufficient to transmit the first, second and third bi-level images if it is approximately 20–40 Kbps.

22. The system of claim 17 wherein said large bandwidth is large enough if it is approximately 20–40 Kbps.

23. The system of claim 17 wherein said bandwidth is too small to transmit the first, second and third bi-level images if it is less than about 20 Kbps.

24. The system of claim 14 wherein the first, second and third bi-level video frames are encoded with a bi-level video coding technique.

25. The system of claim 14 wherein encoding the first, second and third bi-level images comprises sub-modules for:
coding said first bi-level image, for each pixel in raster order:
computing a context and assigning context number to said context;
indexing a probability table using the context number;
using the indexed probability to drive an arithmetic coder;
terminating said arithmetic coder when the final pixel in the first bi-level image has been processed; and
coding said second bi-level image, for each pixel in raster order:
computing a context and assigning context number to said context;
indexing a probability table using the context number;
using the indexed probability to drive an arithmetic coder;
terminating said arithmetic coder when the final pixel in the second bi-level image has been processed; and
coding said third bi-level image, for each pixel in raster order:
computing a context and assigning context number to said context;
indexing a probability table using the context number;
using the indexed probability to drive an arithmetic coder;
terminating said arithmetic coder when the final pixel in the third bi-level image has been processed.

26. The system of claim 14 wherein encoding the first, second and third bi-level images comprises separately encoding each bi-level image using a bi-level encoding technique.

27. The system of claim 14 wherein encoding the first, second and third bi-level images comprises:
  combining the second and third bi-level images by summing the pixel values of corresponding pixel locations of these images to create a combined bi-level image;
  separately encoding the first bi-level image and the combined bi-level image using a bi-level encoding technique.

28. The system of claim 27 wherein encoding the combined bi-level image using the bi-level encoding technique comprises, for each pixel in raster order:
  determining whether the correspondingly located pixel in the first bi-level image has the first binary value or the second binary value;
  whenever the correspondingly located pixel in the first bi-level image has the first binary value,
    computing a context and assigning context number to said context;
    indexing a probability table using the context number;
    using the indexed probability to drive an arithmetic coder; and
  whenever the correspondingly located pixel in the first bi-level image has the second binary value,
    computing a context and assigning context number to said context;
    indexing a probability table using the context number;
    using the indexed probability to drive an arithmetic coder.

29. The system of claim 28 wherein computing the context whenever the correspondingly located pixel in the first bi-level image has the first binary value comprises:
  assigning a value to each context position of the context equal to the value of the corresponding pixel location of the combined bi-level image whenever that pixel location in the first bi-level image has the first binary value, otherwise assigning the second binary value.

30. The system of claim 28 wherein computing the context whenever the correspondingly located pixel in the first bi-level image has the second binary value comprises:
  assigning a value to each context position of the context equal to the value of the corresponding pixel location of the combined bi-level image whenever that pixel location in the first bi-level image has the second binary value, otherwise assigning the first binary value.

31. The system of claim 28 wherein a significant region of is defined as the pixels in the first partial grayscale image, $S_1$, to that have a value that exceeds $T_{21}$ and the pixels of the second partial grayscale image that have a value less than $T_{22}$; and wherein said probability table is trained using only the significant regions.

32. A computer-implemented process for creating a multi-level portrait video, comprising the following process actions:
  obtaining a frame in grayscale format;
  converting the frame in grayscale format to a frame in $2^i$ level video format, to obtain a bit stream of the frame in $2^i$ level video and $2^{i-1}$ partial images of the frame in grayscale format;
  dividing each partial image into two smaller partial images using $2^{i-1}$ thresholds;
  converting each of said smaller partial images into a bi-level image using a threshold;
  combining the smaller partial bi-level images to obtain a combined bi-level image;
  compressing the combined bi-level image combined into the lowest bit plane of a frame of the $2^{i+1}$ level video and the bit stream of the frame of the $2^i$ level video; and
  combining said combined bi-level image into the lowest bit plane of a frame of a $2^{i+1}$ level video with the bit stream of the frame of the $2^i$ level video.

33. The computer-implemented process of claim 32 further comprising the process action of at least one of:
  transmitting the compressed bit streams; or
  storing the compressed bit streams.

34. The computer-implemented process of claim 33 further comprising the process actions of:
  obtaining the at least one of transmitted or stored compressed bit streams;
  decompressing the combined bi-level image compressed into the lowest bit plane of a frame of a $2^{i-1}$ level video and the bit stream of the frame of the $2^i$ level video prior to combining the highest i bit plane of each frame of the $2^i$ level video and the lowest bit plane of each frame of the combined bi-level image to obtain each frame of the $2^{i+1}$ level video.

35. The computer-implemented process of claim 32 further comprising the process action of:
  downsampling bit rates of the third or higher bit planes.

36. The computer-implemented process of claim 35 wherein said down sampling process action comprises:
  dividing the $2^{i+1}$ level video into 2 by 2 pixel blocks;
  if the values of the four pixels in all bit planes that are higher than the current bit plane are the same, regarding the average binary value of the current bit plane as the binary value of all four pixels in the current bit plane;
  coding the pixels in raster order such that the binary values of all the other three pixels in the current bit plane are predicted but only the bottom right one is coded; and
  not setting the binary values of all the other three pixels in the current plane until the bottom right pixel is decoded.

* * * * *